Feb. 27, 1968     W. A. SPECK     3,371,251
PANEL ASSEMBLY WITH IMPROVED INSULATING MEANS
Filed Aug. 16, 1965     4 Sheets-Sheet 1

FIG. I.

WITNESSES:
John L. Clopp
James F. Young

INVENTOR
Willis A. Speck
BY
William A. Elchik
ATTORNEY

United States Patent Office 3,371,251
Patented Feb. 27, 1968

3,371,251
PANEL ASSEMBLY WITH IMPROVED
INSULATING MEANS
Willis A. Speck, Trumbull, Conn., assignor to Westinghouse Electric Corporation, Pittsburgh, Pa., a corporation of Pennsylvania
Filed Aug. 16, 1965, Ser. No. 480,011
7 Claims. (Cl. 317—119)

ABSTRACT OF THE DISCLOSURE

A panel assembly comprising a pair of elongated bus bars and insulating means supporting the bus bars in a spaced relationship and insulating the bus bars from each other.

An object of this invention is to provide a panel assembly with improved insulating means providing adequate electrical clearances between a pair of closely spaced bus bars of opposite polarity.

Another object of this invention is to provide an improved panel assembly comprising a pair of elongated bus bars and insulating means supporting the bus bars in a spaced relationship and insulating the bus bars from each other.

Another object of this invention is to provide an improved panel assembly comprising a pair of bus bars fixedly supported in a generally suspended closely spaced relationship with insulating means captured in place on the bus bars.

Another object of this invention is to provide a panel assembly comprising improved means supporting and insulating a pair of bus bars such as to permit effective heat dissipation.

Another object of this invention is to provide an improved panel assembly comprising an improved bus bar insulating means that can be used with a standard bus bar and also with a modified and uprated bus bar comprising the standard bus bar and a supplemental bus bar fixedly secured to the standard bus bar.

Another object of this invention is to provide an improved panel assembly having insulating means for providing adequate electrical clearances between adjacent bus bars which insulating means is dependable in service and relatively inexpensive to manufacture and install.

Another object of this invention is to provide a panel assembly comprising a pair of spaced bus bars with separate and interchangeable insulating means on the opposite bus bars which insulating means may be utilized on bus bars of different lengths whereby a supplier of the insulating means can maintain a reduced stock.

The novel features that are considered characteristic of the invention are set forth in particular in the appended claims. The invention itself, however, both as to structure and operation, together with additional objects and advantages thereof, will be best understood from the following description when read in conjunction with the accompanying drawings.

Figure 1:
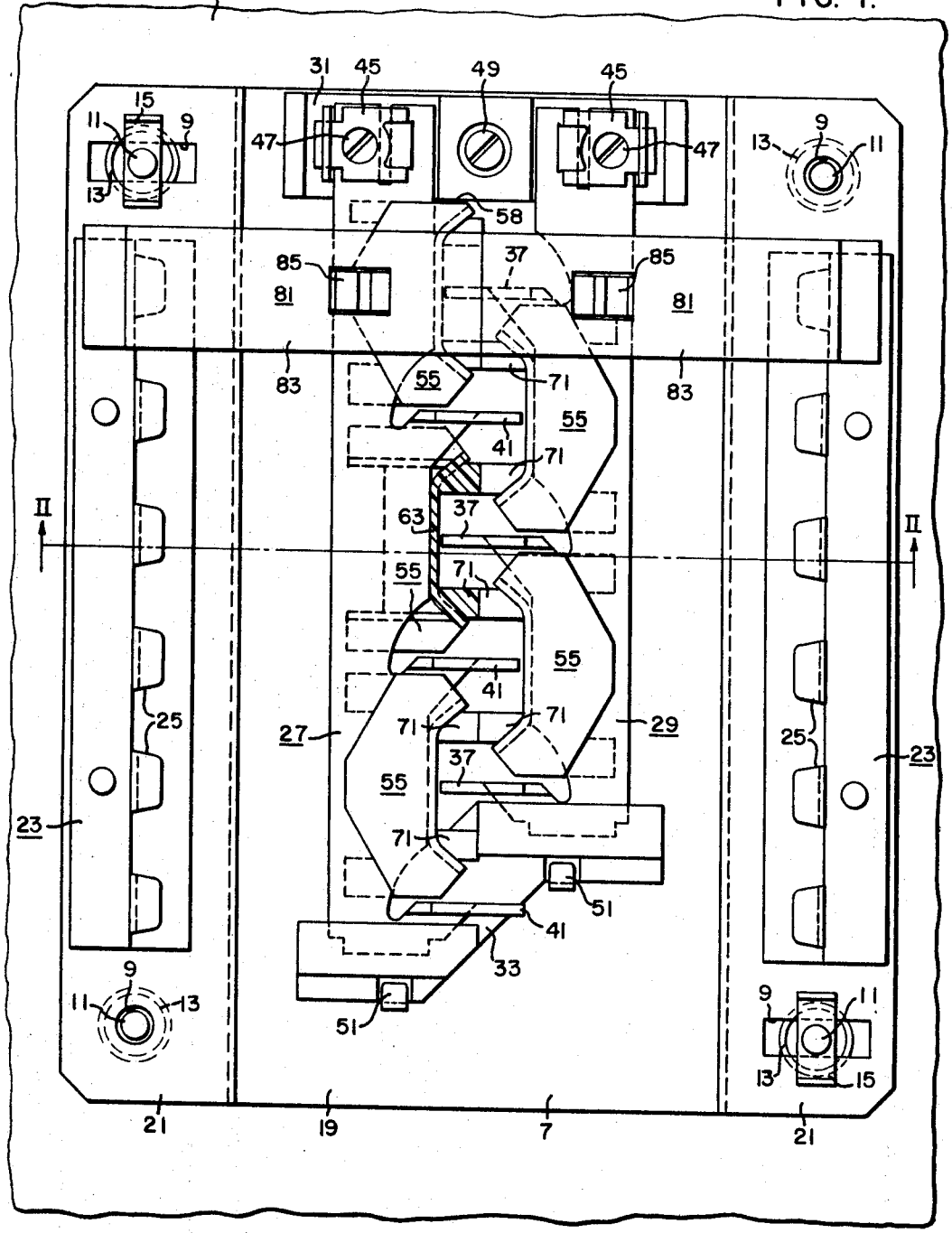
FIGURE 1 is a plan view, with parts broken away, of part of a panel assembly comprising the subject invention.
Figure 2:
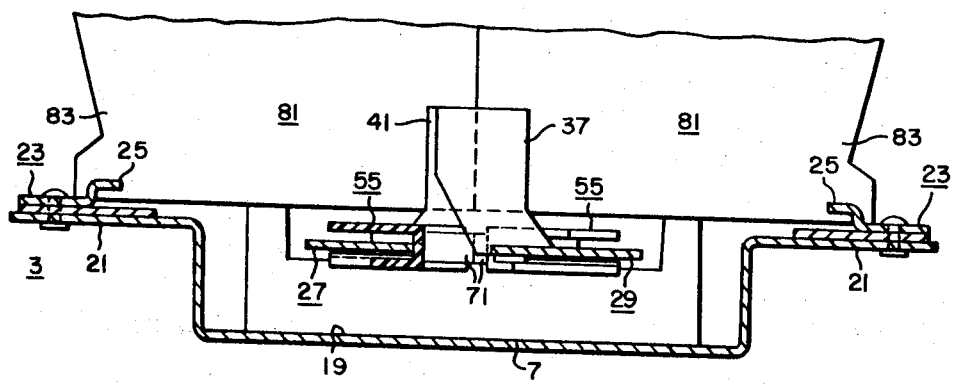
FIG. 2 is a sectional view through the supporting pan and parts supported on the supporting pan and taken along the line II—II of FIG. 1 illustrating the supporting pan and structure supported thereby.
Figure 3:
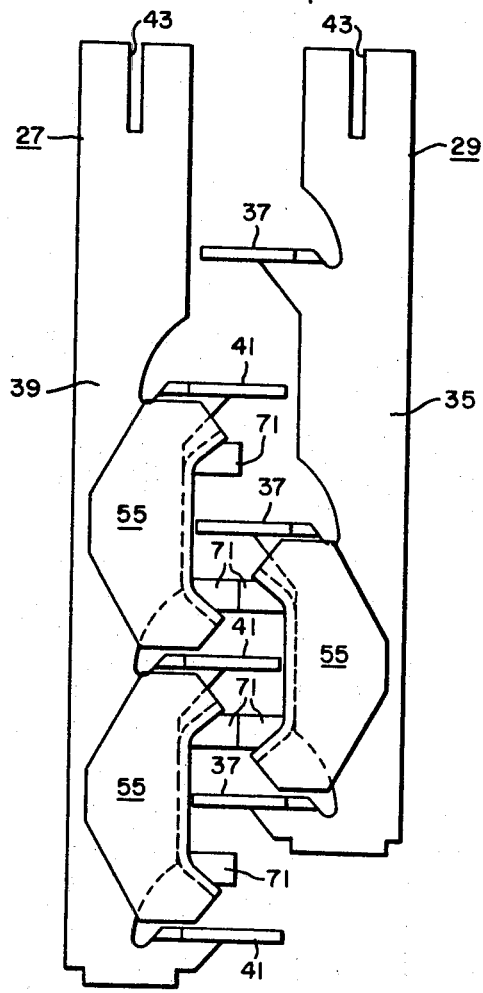
FIG. 3 is a plan view, with parts broken away, illustrating the spaced bus bars and the insulating means providing electrical clearances between the bus bars.
Figure 4:
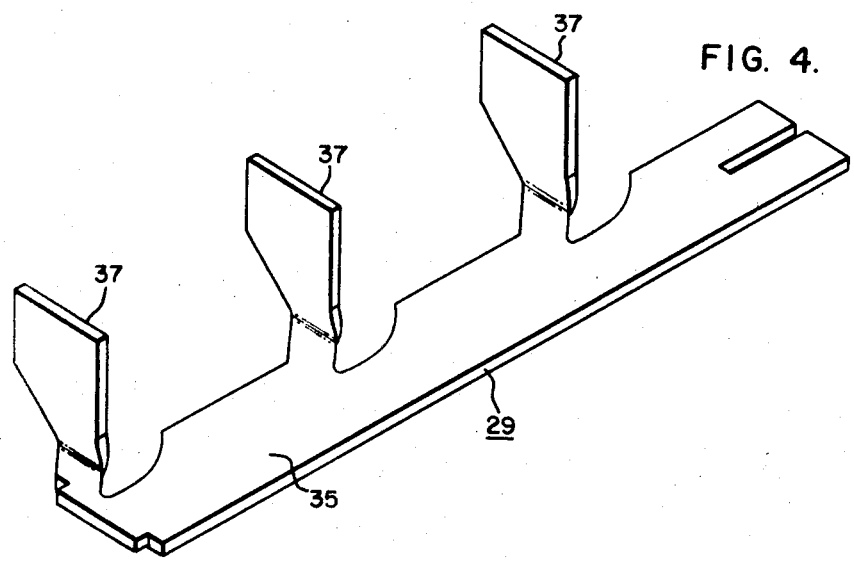
FIG. 4 is a perspective view of one of the bus bars seen in FIG. 3.
Figure 5:
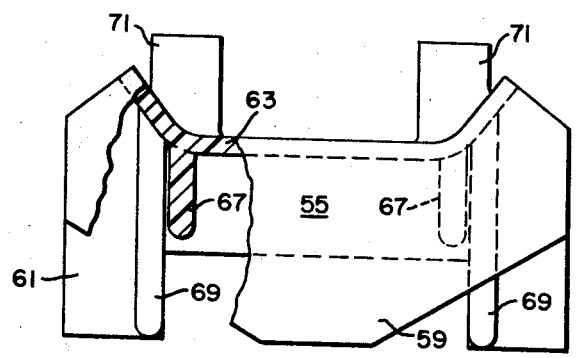
FIG. 5 is a plan view, with parts broken away, of one of the insulators seen in FIGS. 1–3.
Figure 6:
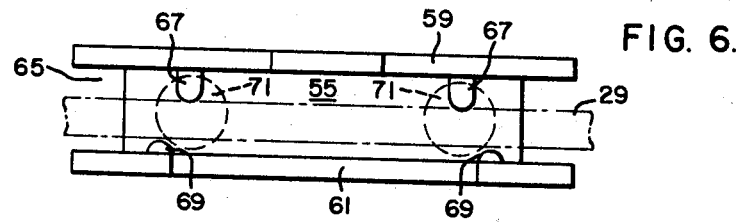
FIG. 6 is an end view of the insulator seen in FIG. 5 with a bus bar shown in dot-and-dash lines.

Referring to the drawings, and particularly to FIGS. 1 and 2, there is shown therein a part of a load center or panel assembly 3 comprising a sheet metal enclosure back wall 5. The back wall 5 is part of a standard load center or panelboard enclosure that also comprises side wall means extending generally normal to the back wall to form an open front which is covered by means of a receptacle door that may be pivotally mounted on the receptacle in a well known manner. A sheet metal supporting pan 7, having four openings 9 therein at the four corners of the pan, is supported on four posts 11 that extend through the four openings 9. The posts 11 are fixedly secured to the base 5. Four compression springs 13, one on each of the posts 11, bias the pan 7 away from the base 5 toward the opening of the receptacle which movement is limited by engagement of the pan with two locking members 15. The members 15 are rotatably mounted on two diagonal posts 11 and they are rotatable to a locking position (FIG. 1) to engage the pan to limit the outward movement of the pan 7. The supporting pan 7 is a sheet metal member comprising a lower support part 19 and two upper supporting shelf parts 21. Two retaining plate structures 23, each comprising a plurality of retaining hooks 25, are fixedly supported on the shelf parts 21 of the supporting pan 7. A pair of rigid conducting bus bars 27 and 29 is supported at the upper end thereof by a rigid elongated insulating support member 31 and at the lower end thereof by a rigid, generally Z-shaped insulating support member 33. As can be seen in FIG. 2, the bus bars are suspended in air over the supporting pan 7 between the insulating supports 31 and 33. As can be seen in FIG. 4, the bus bar 29 is a rigid one-piece conducting member comprising an elongated planar base part 35 and three stab members 37 bent over and extending upward along planes generally normal to the plane of the base part 35. As can be seen in FIG. 3, the bus bar 27 is similarly constructed with an elongated planar base part 39 and three bent over stab members 41 extending upward from the base part 39 along planes generally normal to the plane of the base part 39. Each of the bus bars 27 and 29 is provided with a slot 43 at the upper end thereof, which slot is provided to receive part of a separate solderless terminal connector 45 that is suitably connected to the associated bus bar and that is supported on the insulating support 31. The solderless terminal connectors 45 are standard screw-type pressure connectors each of which comprises a screw 47 rotatable to move a conducting plate to provide a pressure engagement between a conducting line, that would be brought into an open end of the connector 45, and the associated bus bar in a well known manner. As can be seen in FIG. 1, the upper insulating support 31 is fixedly supported on the pan 7 by means of a screw 49 that is seated in a depression in the insulator 31. The lower insulating support member 33 is secured in place by means of the bus bars 27, 29 and bent over flange members 51 that are bent over from the generally planar base 5 to provide hook type ledges that fit over portions of the member 33 to capture the insulating support member 33 in place. Suitable securing means (not shown) fixedly secure the upper end of the bus bars 27, 29 and the solderless connectors 45 to the insulating support member 31. The lower ends of the bus bars 27, 29 fit into suitable slots in the rigid Z-shaped insulator 33, and, because the insulator 33 is supported against movement in a downward (FIG. 1) direction, the rigid bus bars 27, 29 are mounted in a fixed spaced relationship on the mounting pan 7 with the main portions thereof suspended over the mounting pan 7 by means of the end-type supports 31, 33. The bus bars 27, 29 are positioned such that the stab portions 41, 37 are in an aligned relationship with the adjacent stabs being from opposite bus bars. As can be seen in FIG. 1, five separate insulating members 55 are mounted on the bus bars 27, 29 to provide adequate electrical clearances between the bus bars that are of opposite polarity. The four lowermost (FIG. 1) separate insulating members 55 are of identical construction. The fifth and uppermost (FIG. 1) insulating member 55 is identical to the other four except that a small upper (FIG. 1) part thereof is machined off (at 58) in order to fit the uppermost member in place adjacent the insulating support 31. For this reason, only one of the four lowermost (FIG. 1) members will be specifically described. Referring to FIGS. 5 and 6, the insulating member 55 disclosed therein comprises an upper (FIG. 6) part 59 having a generally planar upper surface, a lower (FIG. 6) part 61 having a generally planar lower surface and a bight portion 63 joining the upper and lower parts 59, 61. There is a bus bar receiving slot 65 between the upper and lower parts 59, 61. Two short spacing ribs 67 are formed along the inner surface of the upper part 59 and they extend from the base 63 toward the open end of the slot 65. Two long spacing ribs 69 are formed along the internal surface of the lower part 61 and they extend from the bight portion 63 toward the open end of the slot 65. Two spacing leg parts 71 extend from the external side of the bight portion 63 in a direction away from the slot 65. The insulating member 55 as seen in FIG. 5 is molded as an integral unit of rigid molded insulating material.

Referring to FIG. 3, the bus bars 27, 29 are disclosed with three of the insulating members 55 supported thereon in order to illustrate the mounting arrangement of the insulating members on the bus bars. Referring to FIG. 1, it is to be noted that during the mounting operation of the bus bars 27, 29, the insulating members 55 are first mounted on the bus bars with the bus bars disposed in the associated slots 65 of the members 55, and thereafter the bus bars are mounted in position in a fixed relationship on the end-type supports 31, 33. The upper and lower parts 59, 61 (FIGS. 5 and 6) limit movement of the insulating members 55 in a direction generally normal to the plane of the paper as seen in FIG. 1. The insulating members 55 will engage the associated stabs 41 or 37 to limit movement in a vertical direction in the plane of the paper as seen in FIG. 1. Each of the insulating members 55 is limited against horizontal movement in the plane of the paper as seen in FIG. 1 by the engagement of the bight portion 63 thereof with the associated bus bar and by the engagement of at least one of the spacing foot members 71 thereof with stop means. As can be seen in FIG. 1, at least one of the spacing foot members 71 of each of the insulating members 55 engages a spacing foot member 71 of one of the members 55 that is disposed on the adjacent bus bar. The lower (FIG. 1) spacing foot member 71 of the lower insulating member 55 engages a part of the Z-shaped support. During the mounting operation, the insulating members 55 are merely placed on the bus bars 27, 29, and when the bus bars 27, 29 are mounted in a fixed relationship on the insulating support members 31, 33, the insulating members 55 are captured in place on the bus bars 27, 29. Referring to FIG. 6, it will be noted that the bus bar 29 is spaced from the upper and lower wall parts 59, 61 by means of the spacing ribs 67, 69. With the provision of spacing ribs 67, 69 more bus bar surface is exposed for heat dissipation.

Figure 7:
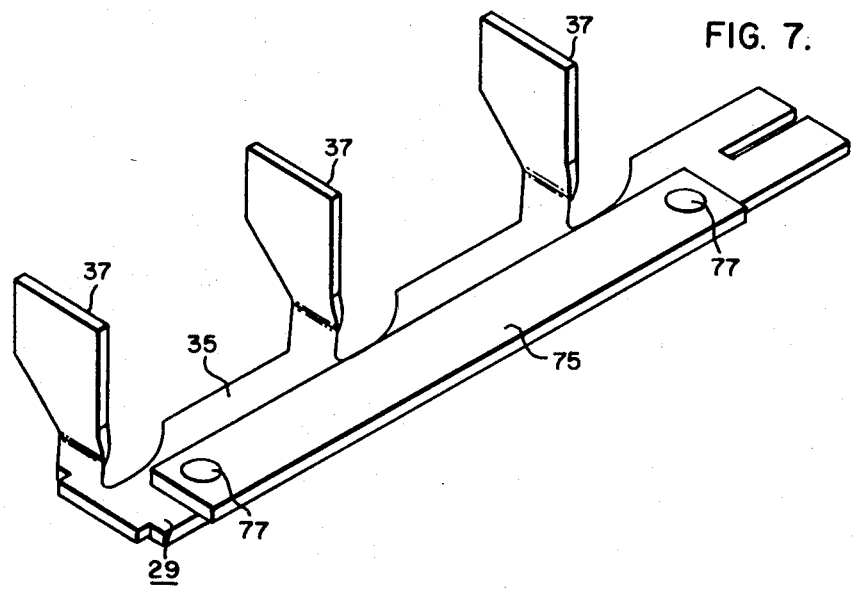
FIG. 7 is a perspective view of a modified form of bus bar.
Figure 8:
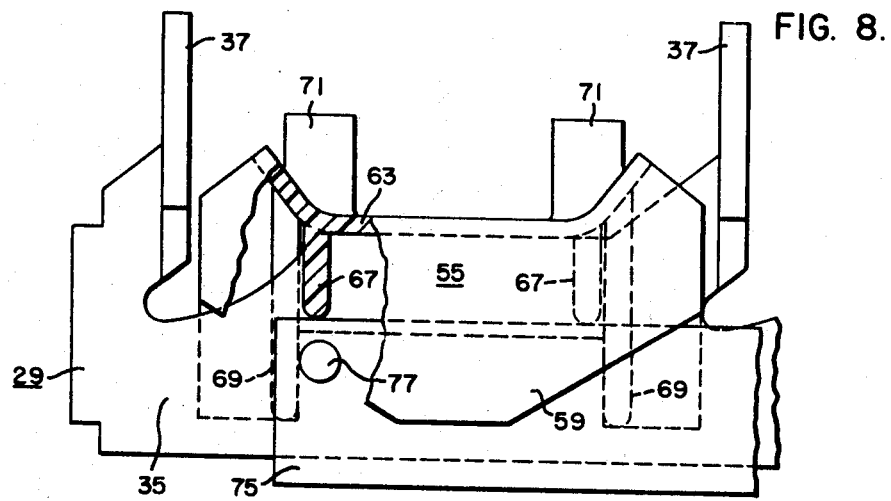
FIG. 8 is a partial plan view with parts broken away, illustrating the use of the insulator of FIGS. 1–3, 5 and 6, with the bus bar of FIG. 7.
Figure 9:
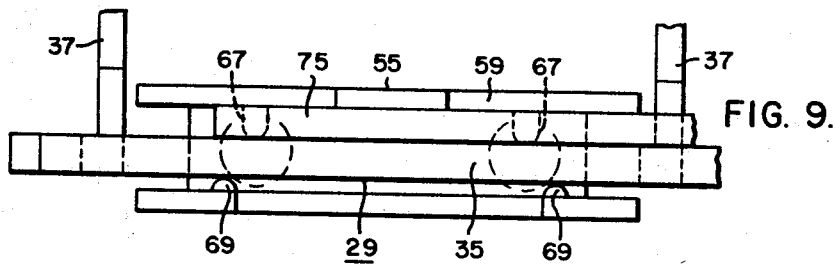
FIG. 9 is a partial end view of the bus bar and insulator of FIG. 8.

For certain installations it is desirable to increase the rating of the basic bus bar by attaching a supplemental bus bar. As can be seen in FIG. 7, a supplemental bus bar 75 is fixedly secured in a conducting relationship to the part 35 of the bus bar 29 by suitable securing means such as rivets 77. As can be seen in FIGS. 8 and 9, with the provision of the short spacing ribs 67, the same insulating member 55 can be used in a panel assembly wherein the bus bars are uprated by means of supplemental bus bars 75. The upper spacing ribs 67 are short enough so that the supplemental bus bars 75 can fit within the slot of the spacing member 55 in the manner disclosed.

When the panel assembly is mounted at an installation a plurality of circuit breakers are mounted on the assembly and connected to the conducting stabs 37, 41 in a well known manner. The circuit breakers, two of which are seen at 81 in FIG. 1, may be of the type disclosed in the patent to L. W. Dyer, Patent No. 2,677,025, issued April 27, 1954, and assigned to the assignee of the instant case. Each of the circuit breakers 81 comprises an insulating housing 83 having an operating handle 85 extending from the front of the housing, which handle is movable between two operating positions to open and close a pair of contacts enclosed within the housing in a well known manner. Each of the circuit breakers is mounted at the line end thereof on one of the conducting stabs 37 or 41 by means of a plug-in or clip-on type connecting terminal structure. Each of the circuit breakers 81 is mounted at the other end thereof on the associated shelf portion 21 of the mounting pan structure 7, and one of the hook members 25 of the shelf portion 21 engages over a shoulder part of the circuit breaker to retain the load end of the circuit breaker in place. Each of the circuit breakers 81 is provided with a well known type of solderless terminal connector at the load end thereof to permit connection of the circuit breaker in an electric circuit. Only two circuit breakers are disclosed in FIG. 1, it being understood that at an installation a separate pair of circuit breakers 81 may be connected to each of the conducting stabs 37, 41.

From the foregoing, it can be understood that there is provided by this invention an improved panel assembly comprising a pair of stab-type bus bars and insulating means (31, 33, 55) supporting the bus bars in a spaced relationship and insulating the bus bars from each other. Each of the bus bars comprises an elongated planar main body part and a plurality of planar stabs extending from the main body part with each stab being along a separate plane that is normal to the plane of the associated main body part and that is normal to the direction of elongation of the associated main body part. The stabs are disposed in an aligned interleaved relationship with each stab being along a separate plane with the separate planes being parallel. As can be understood with reference to FIGS. 1-6, the insulating means comprises ledge means at each of the two opposite sides thereof with each ledge means comprising a plurality of ledge parts (the upper parts 59, FIGS. 5 and 6) along the length (FIG. 1) of the insulating means. At each of the two opposite sides of the insulating means all adjacent ledge parts are spaced by a separate stab-receiving opening (FIG. 1). The ledge parts and the stab-receiving openings of the two opposite sides are staggered lengthwise such that each stab-receiving opening is opposite a part of an opposite bus bar is opposite a ledge part of the opposite side of the insulating means. Thus, each stab (FIG. 1) is insulated from the main-body part of the opposite bus bar by means of one of the ledge parts 59 that is positioned over part of the main body part of the opposite bus bar. As can be seen in FIGS. 5 and 6, each of the ledge parts 59 has a pair of molded projections or rib portions 67 molded integral therewith at the underside thereof for engaging part of the main body part of the associated bus bar to space the main body part of the associated bus bar from the main undersurface of the ledge part to thereby increase the amount of bus bar surface that is exposed to the atmosphere for heat dissipation. As can be seen in FIGS. 5 and 6, the insulating means is provided with slot means 65 open at the sides for convenient assembly of the panel arrangement. The bus bars and insulating means are held together as a unit merely by mounting the bus bars and insulating means in position by means of the parts 51 (FIG. 1) and the screw member 49.

The insulating means comprises a plurality of rigid molded insulating members each of which members fits on the base part of a bus bar between two of the bus bar stabs. Each of the insulating members is provided with upper and lower spacing ribs that space the associated bus bar from the upper and lower wall portions of the insulating member to provide increased bus bar surface exposure for better heat dissipation. The insulating members are so shaped as to provide adequate electrical clearances with maximum bus bar surface exposure. The insulating members are easily assembled on the panel assembly in that they are merely placed in position to be captured in place when the bus bars are mounted on the bus bar support members. It can be understood that the improved mounting and insulating means of this invention provides adequate insulation easy to assemble with increased bus-bar surface exposure all of which is effected with a relatively small amount of molded insulating material. With the provision of separate insulating members disposed between adjacent stabs of each bus bar, the same insulating support members can be used on panel assemblies of different lengths. Moreover, the same insulating member can be used on either of the two bus bars of the spaced pair of bus bars. With the stepped rib construction wherein the upper rib portions are shorter in length than the lower rib portions, the same insulating member can be used not only on the standard basic bus bar; but also on the uprated bus bar that comprises the standard bus bar plus the supplemental bus bar. Thus, it can be understood that a supplier can stock a smaller supply of insulating members that are usable in different applications on either of two bus bars of the pair and also on different lengths of bus bars.

While the invention has been disclosed in accordance with the provisions of the patent statutes, it is to be understood that various changes in the structural details and arrangement of parts thereof, may be made without departing from some of the essential features of the invention. It is desired, therefore, that the language of the appended claims be given as reasonably broad an interpretation as is permitted by the prior art.

I claim as my invention:

1. A panel assembly comprising a supporting pan, a pair of elongated bus bars, each of said bus bars comprising an elongated planar main body part and a plurality of stabs extending from said main body part along planes generally normal to the plane of said main body part, insulating support means at opposite ends of said elongated bus bars supporting said bus bars in a fixed relationship with said stabs being disposed in an aligned interleaved relationship, a plurality of insulating members on each of said bus bars, each of said insulating members comprising a rigid member of molded insulating material having a slot therein which slot receives a portion of the main body part of the associated bus bar, the dimensions of said bus bars and said insulating members being such that the space between each pair of adjacent stabs of each bus bar is occupied by a separate insulating member, and each of said insulating members engaging the associated bus bar and at least one of the insulating members on the opposite bus bar such that said insulating members are captured in place when said bus bars are supported in said fixed relationship.

2. A panel assembly comprising a pair of elongated bus bars, each of said bus bars comprising an elongated main body part and a plurality of planar stabs extending from said main body part, insulating means supporting said bus bars in a spaced relationship and insulating said bus bars from each other, said stabs being disposed in an aligned interleaved relationship with each stab being along a separate plane with the separate planes being parallel, said insulating means comprising a ledge means at each of two opposite sides thereof, each of said ledge means comprising a plurality of ledge parts along the length of said insulating means, at each of said two opposite sides of said insulating means each pair of adjacent ledge parts being spaced by a separate stab-receiving opening, said ledge parts and said stab-receiving openings of said two opposite sides being staggered lengthwise such that each stab-receiving opening that is opposite a part of an opposite bus bar is opposite a ledge part of the opposite side of the insulating means, said bus bars and said insulating means being constructed and arranged such that each stab of a bus bar that is between a pair of stabs of the opposite bus bar is positioned in a stab-receiving opening on the associated side of the insulating means and opposite a ledge part of the opposite side of the insulating means whereby the ledge part insulates the stab from the main-body part of the opposite bus bar, and each of said ledge means comprising projection means at the underside thereof for engaging the associated main body part of the associated bus bar to space the associated main body part from the ledge means to provide adequate insulation between bus bars and increased exposure of the associated main body part to the atmosphere for increased heat dissipation.

3. A panel assembly comprising a pair of elongated bus bars, each of said bus bars comprising an elongated main body part and a plurality of planar stabs extending from said main body part, molded insulating means supporting said bus bars in a spaced relationship and insulating said bus bars from each other, said stabs being disposed in an aligned interleaved relationship with each stab being along a separate plane with the separate planes being parallel, said insulating means comprising ledge means at each of two opposite sides thereof, each of said ledge means comprising a plurality of ledge parts along the length of said insulating means, at each of said two opposite sides of said insulating means each pair of adjacent ledge parts being spaced by a separate stab-receiving opening, said ledge parts and said stab-receiving openings of said two opposite sides being staggered lengthwise such that each stab-receiving opening that is opposite a part of an opposite bus bar is opposite a ledge part of the opposite side of the insulating means, said bus bars and said insulating means being constructed and arranged such that each stab of a bus bar that is between a pair of stabs of the opposite bus bar is positioned in a stab-receiving opening on the associated side of the insulating means and opposite a ledge part of the opposite side of the insulating means whereby the ledge part insulates the stab from the main-body part of the opposite bus bar, said insulating means being molded with slot means under each ledge means open at the associated side of said insulating means, and each of said bus bars being supported on a different side of said insulating means with the main body part of each bus bar being positioned in the associated open slot means.

4. A panel assembly according to claim 2, and said insulating means being molded with slot means under each ledge means open at the associated side of said insulating means, and said bus bars being supported on said opposite sides of said insulating means with at least part of the main body part of each bus bar being positioned in the associated open slot means.

5. A panel assembly according to claim 2, said insulating means comprising molded insulating means, and each of said projection means being molded with the associated ledge means at the underside of the associated ledge means.

6. A panel assembly comprising a pair of elongated bus bars, each of said bus bars comprising an elongated main body part and a plurality of planar stabs extending from said main body part, insulating means supporting said bus bars in a spaced relationship and insulating said bus bars from each other, said stabs being disposed in an aligned interleaved relationship with each stab being along a separate plane with the separate planes being parallel, said insulating means comprising a pair of ledge means with one ledge means at each of two opposite sides of said insulating means, each of said ledge means comprising a plurality of ledge parts along the length of said insulating means, at each of said two opposite sides of said insulating means each pair of adjacent ledge parts being spaced by a separate stab-receiving opening, said ledge parts and said stab-receiving openings of said two opposite sides being staggered lengthwise such that each stab-receiving opening that is opposite a part of an opposite bus bar is opposite a ledge part of the opposite side of the insulating means, each of said bus bars being supported on said insulating means with the main body part thereof under a different one of said ledge means, each stab of a bus bar that is between a pair of stabs of the opposite bus bar being positioned in a stab-receiving opening on the associated side of the insulating means and opposite a ledge part of the opposite side of the insulating means whereby the ledge part insulates the stab from the main body part of the opposite bus bar, the widthwise dimension of said pair of ledge means being less than the widthwise dimension of said pair of supported bus bars and said pair of ledge means terminating short of said pair of supported bus bars at the opposite sides thereof.

7. A panel assembly according to claim 6, and insulating projection means on each of said ledge means at the underside of the ledge means engaging the main body part of the associated bus bar to space the main body part of the associated bus bar from the ledge means to provide adequate insulation between bus bars and increased exposure of the associated main body part to the atmosphere for increased heat dissipation.

References Cited

UNITED STATES PATENTS 3,075,039   1/1963   Kobryner _____ 174—71
3,218,519  11/1965  Casey _____ 317—120

ROBERT K. SCHAEFER, *Primary Examiner.*

H. O. JONES, *Assistant Examiner.*